UNITED STATES PATENT OFFICE.

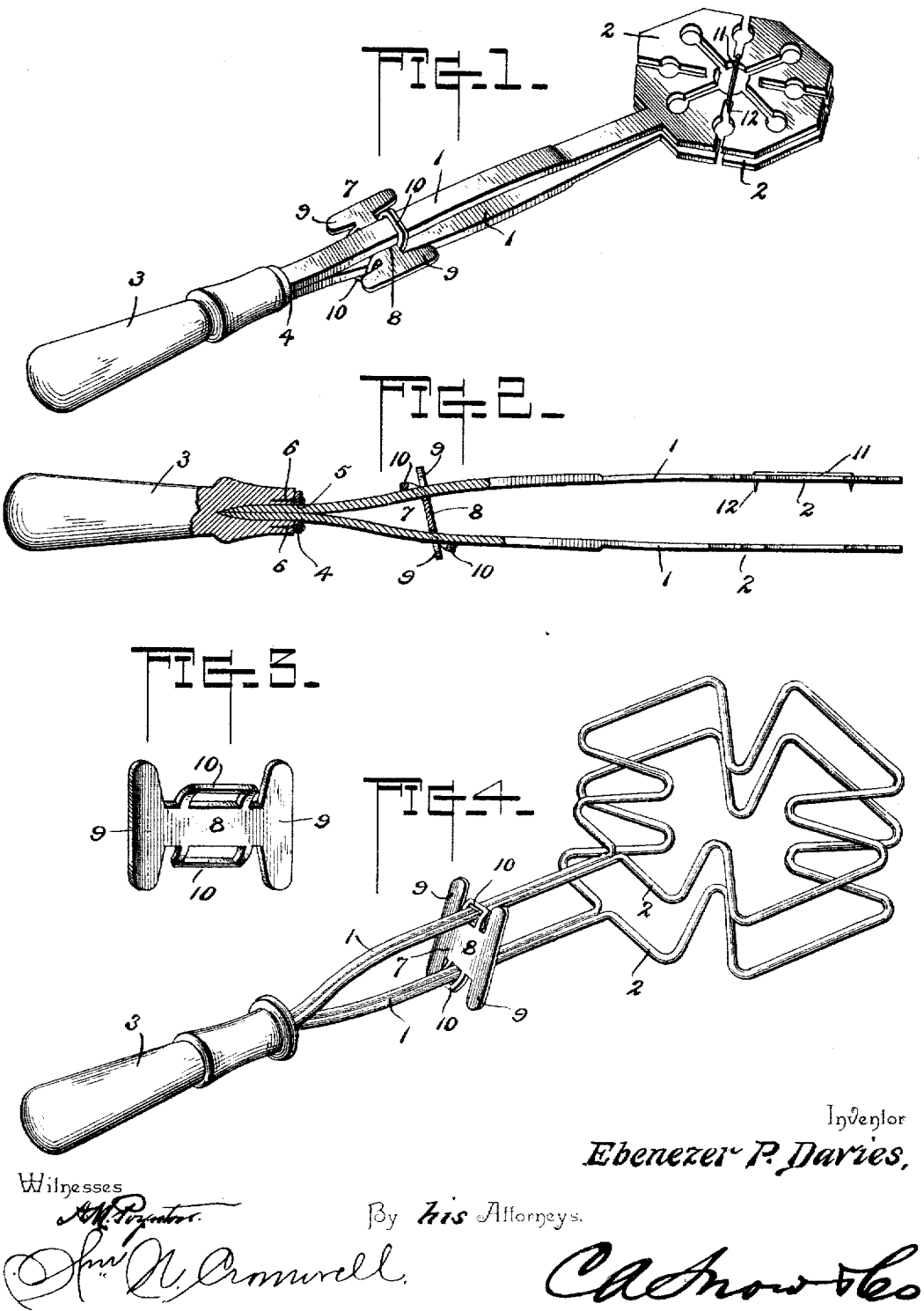

EBENEZER P. DAVIES, OF SCRANTON, PENNSYLVANIA.

TOASTER.

SPECIFICATION forming part of Letters Patent No. 573,574, dated December 22, 1896.

Application filed August 27, 1896. Serial No. 604,101. (No model.)

*To all whom it may concern:*

Be it known that I, EBENEZER P. DAVIES, a citizen of the United States, residing at Scranton, in the county of Lackawanna and State of Pennsylvania, have invented a new and useful Toaster, of which the following is a specification.

This invention relates to improvements in toasters; and it has for its object to improve the construction of such devices and to embody therein simple and efficient means for opening the toasters and locking the same in the open position, thus enabling the articles to be toasted being readily placed in the toasters and securely held thereby.

The invention further aims to so construct the means for opening the toasters as will permit the same being used by either right or left handed persons, and also whereby such means may be employed with toasters of the ordinary construction.

With these objects in view the invention consists substantially in the construction, combination, and arrangement of parts, as will be hereinafter fully illustrated, described, and claimed.

In the accompanying drawings, Figure 1 is a perspective view of a toaster constructed in accordance with the present invention. Fig. 2 is a longitudinal sectional view thereof and illustrating the open position. Fig. 3 is a detail perspective view of the means for opening the toaster. Fig. 4 is a perspective view illustrating a modified form.

Similar numerals of reference indicate corresponding parts throughout the figures.

Referring to the drawings, 1 1 designate a pair of parallel spring-arms, which may be formed of any suitable material, and each is provided at one of its ends with a head 2, of any desired shape, for the purpose of retaining the article to be toasted between the arms 1. The other ends of said arms 1 are disposed in a handle 3, which may also be of any desired construction, and for retaining said arms in the handle 3 a strengthening-disk 4 is employed, said disk having an opening 5 at substantially its center through which the ends of the arms 1 pass, and in order to attach the strengthening-disk 4 to the handle 3 pins 6, or their equivalent, are passed through said disk and enter the adjacent end of the handle 3. By reason of the strengthening-disk 4 being secured to the handle 3 and that the ends of the arms 1 pass through said disk the latter will relieve the handle 3 of all strain when said arms are opened.

Disposed between the arms 1 and for the purpose of forcing said arms apart is a spreader 7, which spreader comprises a plate 8, having at each of its ends a T-shaped finger-piece 9, said finger-pieces projecting beyond the edges of the arms 1, so as to be easily grasped by the person using the toaster when it is desired to manipulate the spreader 7. Formed at each edge of the plate 8 and between the finger-pieces 9 is a loop 10, and it will be noted that said loops are slightly curved and extend in reverse directions, thereby placing each of the same in a position to receive one of the spring-arms 1, so that the latter may readily pass therethrough and said loops be enabled to freely slide on said arms for the purpose of retaining the spreader between the arms.

Fastened in any suitable manner to one of the heads 2 and extending, preferably, in a diagonal direction thereover is a holding-strip 11, said strip having its ends bent at right angles so as to form prongs 12, and it will be noted that said prongs extend from one of the heads 2 to the outer surface of the other head when the toaster is closed, thus placing the ends of the prongs flush with said outer surface. By reason of the prongs 12 extending in such position it will be obvious that the same will readily pass through the article to be toasted after said article has been placed between the heads 2 and the latter permitted to press thereon, thereby securely holding the article during the toasting operation and preventing the same passing from between the heads 2. When, however, the article has been toasted and the head to which the prongs are secured has been moved away from said article, it will be seen that the latter may pass from the other head in a free and easy manner.

In Fig. 4 I have illustrated a modification of the invention, and it will be observed that this form is substantially the same as the ordinary construction of toaster, but in addition thereto the spreader 7 is employed, said spreader being applied in the same manner as illustrated in Figs. 1 and 2 and performing the same function as the spreader illustrated in said figures. If desired, the holding-strip 11 may also be employed with this modified form, and, while not illustrated, it is evident that said strip may be attached to either of the heads and operated in conjunction therewith with the same degree of efficiency as if used with the toaster shown in Figs. 1 and 2.

The operation and advantages of the herein-described toaster will be readily understood by those skilled in the art.

When it is desired to toast an article of any character, the spreader 7 is manipulated so as to assume the position shown in Fig. 2, or substantially at right angles to the position which it occupies when the toaster is closed, thereby forcing the spring-arms 1 away from each other and separating the heads 2. In this position it will be seen that the plate 8 does not lie at right angles to either of the arms 1, but is slightly inclined, thus placing the loops 10 in firm contact with the outside of the arms and locking the spreader, so that the latter will remain in the position described to retain the heads 2 separated from each other and permit the free insertion therebetween of the article to be toasted. After said article has been placed in the toaster and in order to securely hold the same therein it is simply necessary to operate the spreader 7 so that the same will assume the position shown in Fig. 1, and by reason of the arms 1 being of a spring nature, said arms will close upon the article in the toaster, forcing the prongs 12 therethrough and preventing displacement of said article from the toaster.

From the foregoing it will be apparent that I have provided a toaster in which is embodied simple and efficient means for opening and locking the same in the open position, thus enabling articles to be toasted being readily placed in the toaster and securely held thereby; that the means employed for opening the toaster may be readily used by either right or left handed persons; that the operation of placing the article in the toaster is greatly facilitated from the fact that the arms of the latter may be opened and locked in such position without the necessity of constantly grasping the toaster in either of the hands to retain the same open, and, finally, that the means which are employed for holding the arms apart may be used with the ordinary construction of toaster.

Having thus described the invention, what is claimed as new, and desired to be secured by Letters Patent, is—

1. A toaster, comprising a pair of arms, and a spreader disposed between said arms and adapted to be operated so as to force said arms apart and lock the same in such position to permit the insertion therebetween of the article to be toasted, substantially as set forth.

2. A toaster, comprising a pair of arms, and a spreader disposed between said arms, said spreader comprising a plate provided with reversely-arranged loops, each of which receives one of the arms and is adapted to slide thereon for retaining the spreader between said arms, said spreader being adapted to be operated so as to force said arms apart and lock the same in such position to permit the insertion therebetween of the article to be toasted, substantially as set forth.

3. A toaster, comprising a pair of arms each of which is provided at one of its ends with a head, a spreader disposed between said arms and adapted to be operated so as to force said arms apart and lock the same in such position to permit the insertion therebetween of the article to be toasted, and a holding-strip carried by one of the heads and provided with prongs adapted to pass through the article to be toasted and retain the same between said heads, substantially as set forth.

4. A toaster, comprising a pair of arms each of which is provided at one of its ends with a head, and a spreader disposed between said arms and comprising a plate having at each of its ends a T-shaped finger-piece, said plate being also provided at its edges with reversely-arranged loops, each of said loops receiving one of the arms so as to retain the spreader therebetween, said spreader being adapted to be operated so as to force said arms apart and lock the same in such position to permit the insertion therebetween of the article to be toasted, substantially as set forth.

5. A toaster, comprising a pair of arms, a handle secured to one end of said arms, a strengthening-disk attached to one end of said handle and provided with an opening for receiving the arms of the toaster, said disk being adapted to relieve the handle of the strain incident to the opening of the arms, and a spreader disposed between said arms and adapted to be operated so as to force said arms apart and lock the same in such position to permit the insertion therebetween of the article to be toasted, substantially as set forth.

6. A toaster comprising a pair of arms provided at their outer ends with heads having openings, and a holding-strip arranged on the exterior of one of the heads and having its ends bent at an angle to form prongs, the latter being extended through the adjacent openings of the head and arranged to enter the article to be toasted, substantially as described.

In testimony that I claim the foregoing as my own I have hereto affixed my signature in the presence of two witnesses.

EBENEZER P. DAVIES.

Witnesses:
THOMAS M. WATKINS,
JOHN T. MORRIS.